UNITED STATES PATENT OFFICE.

HENRY W. JOHNS, OF NEW YORK, N. Y.

IMPROVEMENT IN ROOFING COMPOUNDS.

Specification forming part of Letters Patent No. 76,773, dated April 14, 1868; Reissue No. 6,191, dated June 30, 1874.

*To all whom it may concern:*

Be it known that I, HENRY W. JOHNS, of the city, county, and State of New York, have invented a new Composition of Matter for Roofs and other surfaces; and that the following is a full, clear, and exact description of the same, and of the manner of preparing and using the same.

In the preparation of cements, mortars, coatings, and pastes, great difficulty has been experienced in obtaining a binding or tying material which shall be flexible, durable, and resist heat and the natural decay produced by the action of the elements which takes place when hair, vegetable fiber, or like substances are used for such purposes. In investigating and experimenting for the attainment of this object, I have discovered that the fibrous mineral known as asbestus possesses all the qualities necessary to fit it to serve as a substitute for the materials heretofore used for the above-named purposes, but without their defects.

I prepare the asbestus by crushing or reducing the fibers as found in nature to a fibrous flock or other desired form, and, when deemed necessary, removing the silex and other foreign matter by any of the well-known means.

I employ this substance known as asbestus as the binding or tying material in the hydraulic or other mortars or cements used for covering surfaces and filling cavities. For this purpose I mix the asbestus with slate, marble-dust, sand, clay, lime, or other minerals or solid materials, and sometimes add oils, asphaltum, varnishes, coal-tar, mineral pitch, wood-tar, and the like equivalent materials, or one or more of them.

The proportions named may be varied at will, according to the various conditions under which the materials are to be used, and the results required, all of which would be fully understood by those skilled in the art, due attention being had to the fact that asbestus varies so greatly in its fibrous quality.

Having thus described my invention, I claim as new and desire to secure by Letters Patent—

Asbestus as the binding or tying material in cements, mortars, pastes, or other coatings, substantially as set forth.

HENRY W. JOHNS.

Witnesses:
T. W. BAXTER,
C. H. PATRICK.